United States Patent
Germino Ferreira Da Silva et al.

(10) Patent No.: US 12,044,346 B2
(45) Date of Patent: Jul. 23, 2024

(54) PIG WITH SCALE DETECTION SENSORS

(71) Applicant: Petróleo Brasileiro S.A.—Petrobras, Rio de Janeiro (BR)

(72) Inventors: Mario Germino Ferreira Da Silva, Rio de Janeiro (BR); José Mauro Teixeira Marinho, Rio de Janeiro (BR)

(73) Assignee: Petróleo Brasileiro S.A.—Petrobras (BR)

( * ) Notice: Subject to any disclaimer, the term of this patent is extended or adjusted under 35 U.S.C. 154(b) by 0 days.

(21) Appl. No.: 17/992,027

(22) Filed: Nov. 22, 2022

(65) Prior Publication Data
US 2023/0167936 A1 Jun. 1, 2023

(30) Foreign Application Priority Data
Nov. 26, 2021 (BR) ............................ 1020210239727

(51) Int. Cl.
*F16L 55/40* (2006.01)
*F16L 55/48* (2006.01)
*F16L 101/30* (2006.01)

(52) U.S. Cl.
CPC .............. *F16L 55/40* (2013.01); *F16L 55/48* (2013.01); *F16L 2101/30* (2013.01)

(58) Field of Classification Search
CPC ....... F16L 55/40; F16L 55/48; F16L 2101/30; F16L 55/28; F16L 55/26; G01M 3/246; G01M 3/005; G01M 3/2823
See application file for complete search history.

(56) References Cited

U.S. PATENT DOCUMENTS

| | | | | |
|---|---|---|---|---|
| 8,925,400 | B2 * | 1/2015 | Hill | F16L 55/28 73/865.8 |
| 2008/0224465 | A1 * | 9/2008 | Pirner | G01B 7/13 700/275 |
| 2015/0330551 | A1 * | 11/2015 | Van Nie | F16L 58/04 73/592 |
| 2016/0018532 | A1 * | 1/2016 | Scott | G01T 1/00 250/336.1 |
| 2019/0078721 | A1 * | 3/2019 | Pirner | B60L 15/2009 |

FOREIGN PATENT DOCUMENTS

| | | | | |
|---|---|---|---|---|
| CN | 209417309 U | * | 9/2019 | ............. G01T 1/202 |
| EP | 2972499 B1 | | 2/2020 | |
| KR | 20160037623 A | * | 4/2016 | ............. B08B 9/027 |
| WO | 2015047454 A2 | | 4/2015 | |

* cited by examiner

*Primary Examiner* — Peter J Macchiarolo
*Assistant Examiner* — Anthony W Megna Fuentes
(74) *Attorney, Agent, or Firm* — Mintz, Levin, Cohn, Ferris, Glovsky and Popeo, P.C.

(57) ABSTRACT

The invention proposed here discloses an instrumented PIG that uses a sufficient number of sensors for detecting the NORM of the scales, variation in the thickness of the scale deposit, internal diameter and detection of the internal position of the beginning and ending of these along the piping. The modular form of the NORM instrumented PIG (1) provides enough flexibility to the invention to allow the passage in curves and ability to tolerate variations in diameters. The system has a mechanical design in which the sensors are mounted on rubber modules, interconnected with each other, forming a mechanically flexible assembly.

6 Claims, 2 Drawing Sheets

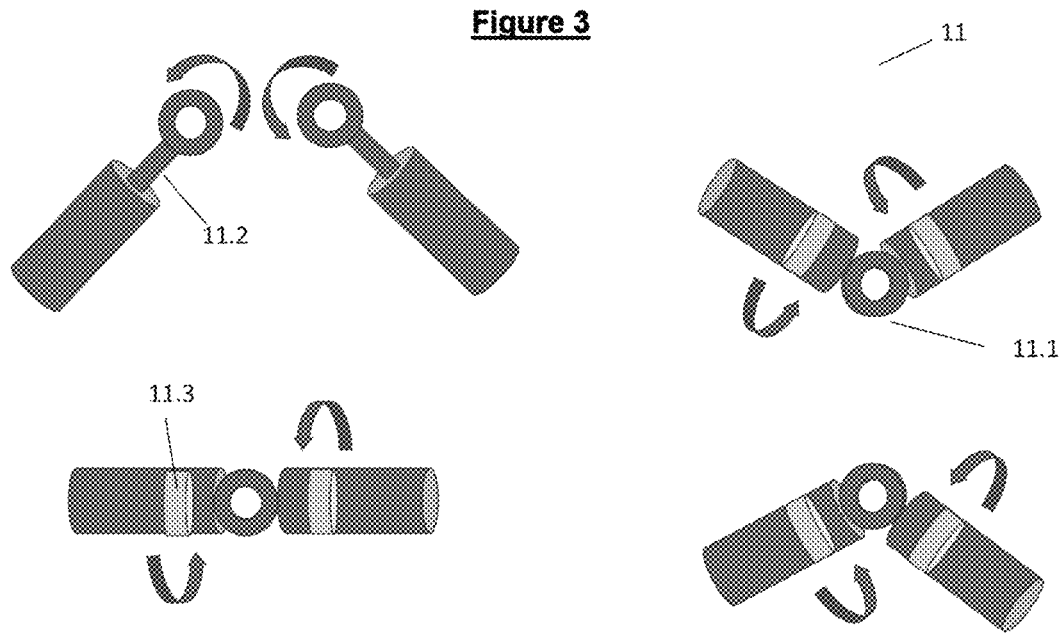

PIG WITH SCALE DETECTION SENSORS

CROSS-REFERENCE TO RELATED APPLICATION

This application claims priority to Brazilian Application No. 10 2021 023972 7, filed on Nov. 26, 2021, and entitled "PIG WITH SCALE DETECTION SENSORS," the disclosure of which is incorporated herein by reference in its entirety.

FIELD OF THE INVENTION

The present invention can be applied in the field of flow assurance (GARESC), it can also be applied in the field of decommissioning of subsea equipment, for planning chemical removal operations of scales from the interior of subsea systems, such as production lines, manifolds and risers. Knowing the exact positioning of the scale deposit within the production line along its length will allow for the planning of displacement volumetry and positioning of the chemical product removal cushion, in order to reach the planned position to guarantee the effectiveness of the treatment.

DESCRIPTION OF THE STATE OF THE ART

The pig is a cylindrical or spherical device designed and used initially for the purpose of cleaning the interior of ducts. It can range from a simple foam cylinder to even a more complex device such as a metallic structure (chassis) with a cylindrical shape, which uses a transverse disc as a guide and seal. The pig is a device similar to a foam cylinder that travels through the interior of a duct driven by the pressure of the fluid itself. Pigs are currently used both to clean and to inspect the inside of the duct. In the latter case they are called instrumented pigs.

Pigging operations are part of a mandatory operational practice for preserving the internal condition of a duct, which aim at removing accumulations of deposits (such as paraffin and corrosion residues) and liquid phases (such as accumulated condensate) inside of the duct, in addition to monitoring the conditions of the internal walls of the same, regarding the occurrence of corrosive processes. These operations are carried out by means of objects called scrapers (pigs), which move inside the ducts driven by a pressurized fluid, between launchers and pig receivers installed on the platform.

The inspection of the inner wall of the duct is carried out by an instrumental pig, which is capable of measuring the extent and location of events such as corrosion residues, dents, ovalizations and folds. These operations are preceded by cleaning pigging in order to prepare the surface, allowing perfect access for the inspection pig along the entire length of the duct, in addition to avoiding the risk of entrapment due to the accumulation of residues that were not removed.

The length of the duct to be inspected, the deposit formation rate and the operational conditions will influence the choice of the type of pig to be used and the frequency of operations. In principle, the frequency of cleaning pigging operations will be once a month, in the production collection system, and once every 1.5 days, for the flow system (export gas pipeline), while inspections with the instrumental pig will be performed every 3 or 5 years.

The technical problem that motivated the invention is the need for detection and location of NORM (Naturally Occurring Radioactive Materials) in subsea rigid ducts, both for planning operations to remove scales with radioactive material and for decommissioning operations of subsea systems. The solution achieved by the invention is the location of scale deposits within subsea lines on the seabed.

This location has two possible applications, the first will allow the treatments for removing scale to be efficiently positioned within the lines thus improving the effectiveness of removing scale, the second in decommissioning can be used for cleaning the lines of production before removing these lines from the seabed. The fields of application will be the flow assurance area (GARESC), the reservoir management, through the chemical removal operations of scales with NORM from the production system, as well as the decommissioning processes of production systems.

NORM, for being a material found dispersed in nature, does not present major dangers. It is a type of radioactive material with a small amount of radionuclides. And a source of radiation that has levels below or equivalent to the exposure limit that an average individual can withstand. The decommissioning of subsea production systems is a reality at Petrobras. The company is preparing to carry out these operations and needs to have this equipment available to clean the ducts that will be removed from the seafloor, especially if they contain NORM-type materials, where appropriate techniques will be required for their transport and final disposal of these materials, which involve protection against radioactive emissions.

The document "*Multi Diameter Technology—In-line Inspection Services For Ducts With Varying Diameter*" discloses a technology for inspection of ducts with variable diameter. The technology consists of vehicles with a high capacity to regulate their diameter, with a traction unit for driving the tooling and inspection units. It further has flexible sealing elements and wheel support, and the friction of these individual units is kept moderate throughout the diameter range. Full sensor coverage is achieved by flexible high-resolution sensor suspensions for metal loss and geometry inspections.

Document WO2015047454A2 discloses a portable radiation detection device, such as a radiation isotopic identification device (RIID), integrated with a personal digital assistance (PDA) device, such as a smartphone, in order to provide better data processing capacity and user interface. The PDA is configured to receive and process data received from the radiation detection device.

Document EP2972499B1 discloses a solid-state ionizing radiation sensor, which is preferably a cadmium zinc telluride detector as they have a high gamma ray density and appropriate resolution energy. The solid-state ionizing radiation sensor provides a fast reading compared to other types of radiation sensors such as scintillator tubes.

The prior art presented does not disclose an equipment capable of relating the position of the scale location, the scale thickness and the TENORM radiation, which differs mainly from EP2972499B1, since it claims an unmanned vehicle capable of only locating the radiation point. In addition to this purpose, the invention will allow identifying critical points to plan the removal of scale and also in decommissioning processes of subsea production systems, to check the conditions of the line.

When scale occurs within the subsea production system, there is loss of production associated with the reduction of the internal diameters of the ducts; then, it is necessary to remove this scale. However, the distances between the stationary production unit and the wet Christmas trees, at the seafloor, are sometimes very large, in some cases reaching kilometers.

In the case of decommissioning an oil field, it is important to clean the lines for environmental legislation issues, since it addresses to the manipulation of radioactive elements, and is in accordance with the nuclear energy commission. With this, it will be necessary to evaluate the lines to identify the source of radiation and next remove these radioactive scales, before removing the lines from the seabed.

In view of the difficulties present in the above-mentioned state of the art, and for solutions for detecting NORM in scales, the need arises to develop a technology capable of performing effectively and that is in accordance with environmental and safety guidelines. The state of the art mentioned above does not have the unique features that will be presented in detail below.

OBJECTIVE OF THE INVENTION

The objective is to disclose a tool to assist in the process of identifying the position of scale in subsea lines or in the decommissioning of subsea production systems, since there may be the presence of naturally occurring radioactive material (NORM). The invention is applicable to a production riser, flexible or rigid production lines, a production manifold and even in the well production string.

Another objective of the invention is to identify the position of the scale, in order to be able to use this information in the planning of the removal operation, to calculate the volumes of chemical removal treatment, as well as the positioning of the removing solutions (chelating) through the displacement calculation, in order to achieve efficient control of these operations and a good result for the removal operation.

BRIEF DESCRIPTION OF THE INVENTION

The invention proposed here discloses an equipment similar to a strategically instrumented pig that uses a sufficient number of sensors for detecting the NORM of the scales, variation in the thickness of the scale deposit, internal diameter and detection of the internal position of the start and end these along the piping. The modular form of the pig equipment provides enough flexibility to the invention to allow the passage in curves and tolerating variations in diameters. The invention consists of, but is not limited to, a NORM instrumenting PIG (1) with: thickness sensor (2) to detect changes in passing drift, position sensor (4), battery (5), NORM sensor (3), all with an extremely compact electronic arrangement. The system has a mechanical design in which the sensors are mounted on rubber modules, interconnected with each other, forming a flexible assembly.

BRIEF DESCRIPTION OF THE DRAWINGS

The present invention will be described in more detail below, with reference to the attached figures which, in a schematic way and not limiting the inventive scope, represent examples of its embodiment. In the drawings, there are:

FIG. 3 showing the connectivity system between modules that are present in the NORM instrumented PIG (1).

DETAILED DESCRIPTION OF THE INVENTION

There follows below a detailed description of a preferred embodiment of the present invention, by way of example and in no way limiting. Nevertheless, it will be clear to a technician skilled on the subject, upon reading this description, possible additional embodiments of the present invention still comprised by the essential and optional features below.

The proposal of this new technology of a NORM instrumented PIG (1) that uses a sufficient number of sensors for detecting the NORM of the scales, variation of the deposit thickness of the scales, internal diameter and detection of the internal position of start and of the end of these along the piping. And, in this way, sufficient flexibility to allow the passage in curves and tolerating variations in diameters.

Figure 1:
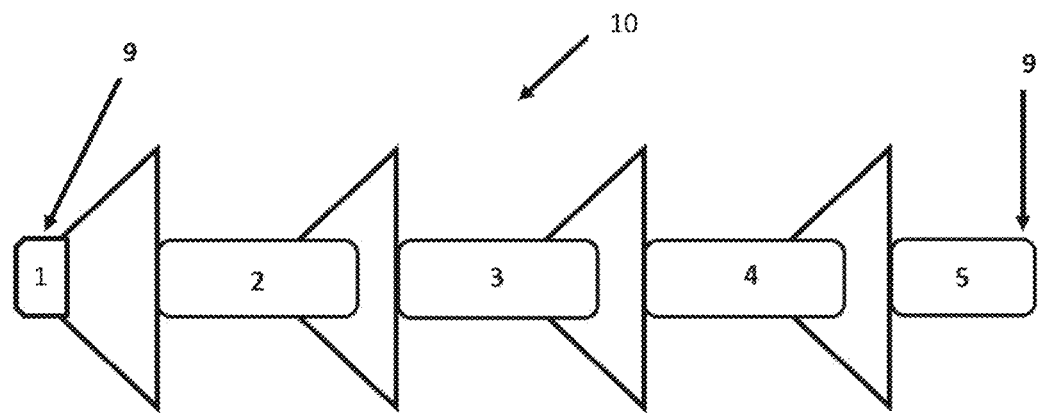
FIG. 1 illustrating the NORM PIG as disclosed by the present application.

The initial layout of the prototype to be used has an innovative design, as illustrated in FIG. 1. It will have a thickness sensor to detect changes in the passing drift; in addition to extremely compact electronics, the system has a mechanical design in which the sensors are mounted on rubber modules, interconnected with each other, forming a flexible assembly. It is related to the ID (internal diameter) of a piping such as the string of a well; for some equipment to pass inside a piping, the external diameter of the equipment must be smaller than the internal diameter of the piping, otherwise it will be stuck. Then, there must be a gap between the piping ID and the OD of the equipment; when this gap is considered, it is said to be the passing drift, which in general has to be smaller than the piping ID.

The essential components of the NORM instrumented PIG (1) are:
1. Module with a Thickness sensor (2): to detect changes in the internal diameter of the production line and allow identifying scale deposition on the line.
2. Module with a NORM sensor (3): to detect the presence of naturally occurring radioactive material (NORM) deposited on the inner wall of ducts and subsea equipment.
3. Module with position sensor (4) of the pig that will allow checking the position in which the pig was within the length of the line, in order to identify the starting and ending position of the section of the line where scale occurred.

The equipment uses simple electronics close to the concept of Arduino electronics; the system has a mechanical design in which the sensors are mounted in rubber modules, interconnected with each other, forming a flexible assembly.

The invention proposed here has the common conical shape in PIGs divided into five modules. The division of NORM instrumented PIG (1) has an odometer (9) in the front part, in the module (2) a mechanism to measure the thickness, in the section (3) the NORM sensor, and in the section (4) a position sensor of ultrasound-type, and in section (5) a power battery and the on-board electronics to obtain the data. The components are seen in FIG. 1.

The odometer (9) is placed on the front part for mechanical sensors based on delta pressure of compressed air or liquid (according to calibration), which is also used to inform the speed of the equipment, or it can be positioned at the rear part, with a wheel that is in contact with the wall of the duct, and thus, the wheel rotates in relative motion with the wall of the duct, and a sensor is positioned on the rim of this wheel, which may have a magnetic identifier (sensor) or optical pickup, both of which count the pulses according to the passage of each tooth. The wheel can also be made in the form of a toothed rim, so that the sensors measure the passage of each tooth.

The thickness sensor of the module (2) is given by geometric sensors spread around the diameter. The section uses sensors from the concept of the stick PIG, which uses a mechanical structure of the stick sensor, basically being a fixed contact stick inside an articulated rod, a shaft of rotating the rod that is fixed to the base of the sensor, and the Hall effect transducer within this shaft. Magnets that provide a constant magnetic field to the shaft and transducer assembly are fixed inside the articulated rod of the stick sensor.

The NORM sensor of module (3) consists of a NaI (TI) scintillator detector duly encapsulated to be used underwater at depths of up to 1500 m. In order for the measurement to be properly correlated with the activity of radioactive material that may be present in scales, it is necessary to determine the detector response curve. The NaI (TI) detector is formed by several structures of different materials, namely: the sodium iodide scintillator crystal, a magnesium oxide coating and the aluminum housing. The sensor action depends on the parameters that represent a given piping, a model of the signal in MeV associated with the presence of the TENORM elements (U-282 and/or Th232), and simulation and data analysis. The reservoir rock contains Uranium and Thorium generated along the decay series. Radium present in these series is soluble in the formation water. The modeling of this system depends on the determination of the response curve of the scintillator detector for a defined geometry; in the case of a flexible duct, it is essential, in the modeling, to consider all the layers of the duct and the respective dimensions and materials, as well as the internal and the external fluids.

The reading resolution of the T Norm detector NaI (TI) sensor will define the speed of passage of the PIG through the lines; in sections with scale occurrence, it is also a function of the internal diameter of the lines.

The module (4) of the NORM instrumented PIG (1) has an ultrasound-type position sensor, and/or static pressure sensors. It also has sensors that measure the ambient temperature for a given position, which serve to assist in the calculation of the activation energy of the removing solutions that will only be by chemical reactions of the identified scales.

The module (5) has the battery, voltage regulators, Arduino, and the on-board electronics for recording the data sent by the sensors.

Figure 2:
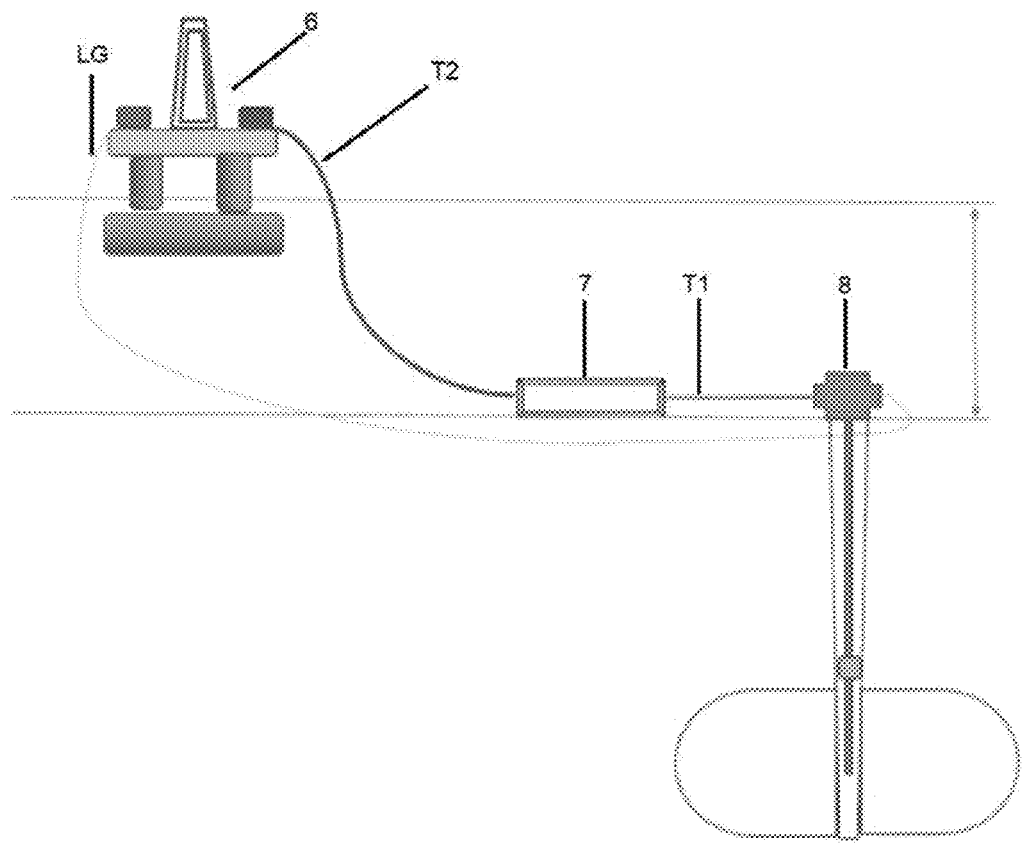
FIG. 2 illustrating a scheme where a SPU is connected to the manifold through the production line that is connected to the wet Christmas tree (WCT) of the oil well through a production line, and gas line is connected from the SPU to the WCT of the well.

FIG. 2 illustrates a scheme where a SPU is connected to the manifold (7) through the production line that is connected to the wet Christmas tree (WCT) (8) of the oil well through a production line (T1 and T2), gas line (GL) connected from the SPU (6) to the WCT (8) of the well. The well production passes through section 1 (T1) of the line that goes from the WCT (8) to the manifold (7) and from the manifold (7) through the section 2 (T2) of the production line to the SPU (6). The NORM instrumented PIG (1) can be used to check for scale deposits inside the production line (T1 and T2).

The invention contributes to the planning of both scale removal operations in active production systems and production systems that are in the phase of decommissioning of subsea systems, since for both processes it allows the positioning of the scale within a production system to be detected, such as, for example, the beginning of the deposit within a production line, the extension of the deposit and the ending of the deposit. This information makes it possible to improve efficiency for the scale removal operation, through the planning of the appropriate volume of the remover solution and the positioning of this solution inside the line, where the scale is positioned, and for the decommissioning operation. The calculation of the amount of deposited material collaborates in the decision process on the disposal of the material or even when it is necessary to plan a chemical removal of the NORM, if necessary, before decommissioning, in order to avoid possible impacts related to the disposal of the NORM material.

FIG. 3 highlights the connectivity between the modules, wherein they are flexibly interconnected modules, as they allow rotation on their own shaft and between modules, and the interconnection takes place by two wheels superimposed by rollers forming a circular rod (11.1), where each wheel is attached to a rod (11.2), which is connected to a disk (11.3), and this disk has rollers in its circumference to enable rotation between the disk and the module. The disk can also act by translating in and out of the module, but with a predetermined distance. This connectivity system (11) between the modules allows translating the NORM instrumented PIG (1) in lines with different radii of curvature and having tolerance for diameter variations.

The invention claimed is:

1. A pig with scale detection sensors, the pig comprising: a cylindrical shape in foam or rubber; cones of polymeric material connected to modules, the modules comprising five modules, wherein a connectivity of each module has a connectivity system, wherein each connectivity system has a circular rod, a rod, and a disk, wherein each connectivity system has rollers around a circumference of each disk to allow rotation and translation movements in relation to the respective module; a front odometer positioned in a first module of the five modules; and sensors positioned in the modules to measure the scale thickness, the sensors comprising: NORM sensors positioned in a first module; an ultrasound sensor, a pressure measurement sensor, and a temperature sensor positioned in a second module; and a battery, voltage regulators, a controller board, and a voltage measurement and data recording device are positioned in a third module.

2. The pig with scale detection sensors according to claim 1, wherein the first module is a front part of the pig, and wherein the first module comprises a sensor that is sensitive to a delta pressure variation of compressed air or liquid.

3. The pig with scale detection sensors according to claim 1, wherein the second module is configured to measure the thickness of the scale, and wherein the second module comprises fixed contact stick type sensors inside an articulated rod.

4. The pig with scale detection sensors according to claim 1, wherein the third module has a sodium iodide scintillator sensor, a magnesium oxide coating, and an aluminum housing.

5. The pig with scale detection sensors according to claim 4, wherein the NORM sensors have a measurement resolution compatible with a speed that will be used in the displacement of the pig through a pumping flow rate of a displacement fluid.

6. The pig with scale detection sensors according to claim 1, wherein the NORM sensors have a measurement resolution compatible with a speed that will be used in the displacement of the pig through a pumping flow rate of a displacement fluid.

* * * * *